(12) United States Patent
Neubauer

(10) Patent No.: US 10,979,850 B1
(45) Date of Patent: Apr. 13, 2021

(54) METHOD AND APPARATUS FOR FEDERATED LOCATION FINGERPRINTING

(71) Applicant: HERE Global B.V., Eindhoven (NL)

(72) Inventor: Nicolas Neubauer, Berlin (DE)

(73) Assignee: HERE GLOBAL B.V., Eindhoven (NL)

( * ) Notice: Subject to any disclaimer, the term of this patent is extended or adjusted under 35 U.S.C. 154(b) by 0 days.

(21) Appl. No.: 16/821,673

(22) Filed: Mar. 17, 2020

(51) Int. Cl.
| | |
|---|---|
| H04W 4/02 | (2018.01) |
| H04W 4/021 | (2018.01) |
| H04W 4/029 | (2018.01) |
| G01C 21/36 | (2006.01) |
| G06K 9/62 | (2006.01) |
| G06N 20/00 | (2019.01) |

(52) U.S. Cl.
CPC ........ *H04W 4/021* (2013.01); *G01C 21/3673* (2013.01); *G06K 9/6251* (2013.01); *G06K 9/6262* (2013.01); *G06N 20/00* (2019.01); *H04W 4/029* (2018.02)

(58) Field of Classification Search
CPC ...... H04W 4/021; H04W 4/029; G06N 20/00; G01C 21/3673; G06K 9/6251; G06K 9/6262
USPC ..................................................... 455/456.3
See application file for complete search history.

(56) References Cited

U.S. PATENT DOCUMENTS

| | | | |
|---|---|---|---|
| 9,712,964 | B2 | 7/2017 | Sharma et al. |
| 2018/0197071 | A1 | 7/2018 | Dong et al. |
| 2018/0349792 | A1 | 12/2018 | Zhao et al. |

OTHER PUBLICATIONS

Abu-Khzam, F. N. et al., *Distributed Dimension Reduction Algorithms for Widely Dispersed Data*, PDCS, Parallel and Distributed Computing and Systems (2002) 5 pages.
Bonawitz, K. et al., *Towards Federated Learning at Scale: System Design*, Proceedings of the $2^{nd}$ SysML Conference (2019) 15 pages.
Qu et al., *Prophet: A Context-Aware Location Privacy-Preserving Scheme in Location Sharing Service*, Discrete Dynamics in Nature and Society, vol. 2017, Article ID 6814832 (2017) 9 pages.
Van der Maaten, L. et al., *Visualizing Data Using t-SNE*, Journal of Machine Learning Research 9 (2008) 2579-2605.
Platform—Locomizer [online] [retrieved Apr. 10, 2020]. Retrieved via the Internet: https://web.archive.org/web/20190904012339/http://locomizer.com/platform/ (dated Sep. 4, 2019) 8 pages.
U.S. Appl. No. 16/821,582, filed Mar. 17, 2020; In re: Neubauer, entitled *Method and Apparatus for Federated Location Fingerprinting*.

*Primary Examiner* — Joel Ajayi

(74) *Attorney, Agent, or Firm* — Alston & Bird LLP

(57) ABSTRACT

Methods described herein relate to identifying a context of a client, and more particularly, to identifying a context of a client while maintaining data privacy and anonymity. Methods may include: providing a machine learning model to a client; receiving a state vector from the client; determining, based on using the state vector as input to the machine learning model, a representative location of the client; and providing, to the client, location-related services or information based on the representative location of the client. The representative location of the client may include a context vector. The context vector may include an indication of a count of points-of-interest for a respective category of a plurality of categories of points-of-interest. A corresponding apparatus and computer program product are also provided.

17 Claims, 14 Drawing Sheets

_US 10,979,850 B1_

METHOD AND APPARATUS FOR FEDERATED LOCATION FINGERPRINTING

TECHNOLOGICAL FIELD

Example embodiments of the present disclosure relate generally to identifying a context of a client, and more particularly, to identifying a context of a client while maintaining data privacy and anonymity.

BACKGROUND

Maps have been used for centuries for providing route geometry and geographical information. Conventional paper maps including static images of roadways and geographic features from a snapshot in history have given way to digital maps presented on computers and mobile devices, and navigation has been enhanced through the use of graphical user interfaces.

Digital maps and navigation can provide dynamic route guidance to users as they travel along a route, or general assistance to a user including point-of-interest identification or general information about a location. Typical digital maps and navigation systems may have copious amounts of information available.

The proliferation of mobile devices and devices able to track the location of people as they move has resulted in a vast amount of location-based data, the usefulness of which is still being explored. Understanding the movement of people within a region may provide information to various consumers of such data. The location information may include the location and movement of pedestrians, cyclists, vehicles, etc., such that data may be used in various manners by various entities to understand the movement of people, vehicles, or the like. Data consumers may include traffic planners, merchants, developers (residential/commercial), city planners, etc. However, data privacy and anonymity is a concern of many users who may want to limit how much information is shared.

BRIEF SUMMARY

Accordingly, a method, apparatus, and computer program product are provided for identifying a context of a client, and more particularly, to identifying a context of a client while maintaining data privacy and anonymity. Embodiments provided herein include an apparatus having at least one processor and at least one non-transitory memory including computer program code instructions. The computer program code instructions are configured to, when executed, cause the apparatus to at least: receive a machine learning model; identify at least one of a location or trajectory; generate a context vector based on a context of the at least one of the location or trajectory; dimensionally reduce the context vector using the machine learning model to generate a state vector; provide the state vector; and receive location-related information or services in response to the state vector.

Causing the apparatus to generate a context vector based on a context of the at least one of the location or trajectory may include causing the apparatus to: identify a plurality of points-of-interest proximate the at least one of the location or trajectory; identify categories for the plurality of points-of-interest; determine a count of points-of-interest for respective categories; and generate a context vector based on the counts of points-of-interest for the respective categories. Causing the apparatus to generate a context vector based on counts of points-of-interest for the respective categories may include causing the apparatus to generate a context vector based on counts of points-of-interest for the respective categories relative to an average count of the points-of-interest for the respective categories.

The apparatus of some embodiments may be caused to store the context vector in a memory together with previously stored context vectors for a plurality of stored context vectors. The apparatus of some embodiments may be caused to: receive a request for a client-updated machine learning model; generate the client-updated machine learning model using the machine leaning model and the plurality of stored context vectors; and provide a representation of the client-updated machine learning model in response to the request for the client-updated machine learning model.

According to some embodiments, the apparatus may be caused to: receive a server-updated machine learning model, where the server-updated machine learning model is based, at least in part, on the representation of the client-updated machine learning model; and rely upon the server-updated machine learning model in lieu of the machine learning model. The apparatus may be caused to: establish a delta between the client-updated machine learning model and the machine learning model, where the representation of the client-updated machine learning model includes the delta between the client-updated machine learning model and the machine learning model. The representation of the client-updated machine learning model may include the client-updated machine learning model.

Embodiments provided herein may include a computer program product having at least one non-transitory computer-readable storage medium having computer-executable program code instructions stored therein. The computer-executable program code instructions may include program code instructions to: receive a machine learning model; identify at least one of a location or trajectory; generate a context vector based on a context of the at least one of the location or trajectory; dimensionally reduce the context vector using the machine learning model to generate a state vector; provide the state vector; and receive location-related information or services responsive to the state vector.

The program code instructions to generate a context vector based on a context of the at least one of the location or trajectory may include program code instructions to: identify a plurality of points-of-interest proximate the at least one of the location or trajectory; identify categories for the plurality of points-of-interest; determine a count of points-of-interest for respective categories; and generate a context vector based on the counts of points-of-interest for the respective categories. The program code instructions to generate a context vector based on counts of points-of-interest for the respective categories may include program code instructions to generate a context vector based on counts of points-of-interest for the respective categories relative to an average count of the points-of-interest for the respective categories.

Embodiments may include program code instructions to store the context vector in a memory together with previously stored context vectors for a plurality of stored context vectors. Embodiments may include program code instructions to: receive a request for a client-updated machine learning model; generate the client-updated machine learning model using the machine learning model and the plurality of stored context vectors; and provide a representation of the client-updated machine learning model in response to the request for the client-updated machine learning model.

According to some embodiments, the computer program product may include program code instructions to: receive a server-updated machine learning model, where the server-updated machine learning model is based, at least in part, on the representation of the client-updated machine learning model; and rely upon the server-updated machine learning model in lieu of the machine learning model. Embodiments may include program code instructions to: establish a delta between the client-updated machine learning model and the machine learning model, where the representation of the client-updated machine learning model includes the delta between the client-updated machine learning model and the machine learning model. The representation of the client-updated machine learning model may include the client-updated machine learning model.

Embodiments provided herein may include a method that includes: receiving a machine learning model; identifying at least one of a location or a trajectory; generating a context vector based on a context of the at least one of the location or trajectory; dimensionally reducing the context vector using the machine learning model to generate a state vector; providing the state vector; and receiving location-related information or services responsive to the state vector.

According to some embodiments, generating a context vector based on a context of the at least one of the location or trajectory may include: identifying a plurality of points-of-interest proximate the at least one of the location or trajectory; identifying categories for the plurality of points-of-interest; determining a count of points-of-interest for respective categories; and generating a context vector based on the counts of points-of-interest for the respective categories. Generating a context vector based on counts of points-of-interest for the respective categories may include generating a context vector based on counts of points-of-interest for the respective categories relative to an average count of the points-of-interest for the respective categories. Methods may include storing the context vector in a memory together with previously stored context vectors for a plurality of stored context vectors.

Embodiments provided herein may include an apparatus that includes: means for receiving a machine learning model; means for identifying at least one of a location or a trajectory; means for generating a context vector based on a context of the at least one of the location or trajectory; means for dimensionally reducing the context vector using the machine learning model to generate a state vector; means for providing the state vector; and means for receiving location-related information or services responsive to the state vector.

According to some embodiments, the means for generating a context vector based on a context of the at least one of the location or trajectory may include: means for identifying a plurality of points-of-interest proximate the at least one of the location or trajectory; means for identifying categories for the plurality of points-of-interest; means for determining a count of points-of-interest for respective categories; and means for generating a context vector based on the counts of points-of-interest for the respective categories. The means for generating a context vector based on counts of points-of-interest for the respective categories may include means for generating a context vector based on counts of points-of-interest for the respective categories relative to an average count of the points-of-interest for the respective categories. An example apparatus may include means for storing the context vector in a memory together with previously stored context vectors for a plurality of stored context vectors.

Embodiments provided herein may include an apparatus having at least one processor and at least one non-transitory memory including computer program code instructions. The computer program code instructions are configured to, when executed, cause the apparatus to at least: provide a machine learning model to a client; receive a state vector from the client; determine, based on using the state vector as input to the machine learning model, a representative location of the client; and provide, to the client, location-related services or information based on the representative location of the client. The representative location of the client may include a context vector. The context vector may include an indication of a count of points-of-interest for a respective category of a plurality of categories of points-of-interest.

According to some embodiments, the apparatus may be caused to: provide a request to the client for a client-updated machine learning model; and receive a representation of a client-updated machine learning model. The apparatus may be caused to update a machine learning model based at least in part on the representation of the client-updated machine learning model. Causing the apparatus to update a machine learning model based, at least in part, on the representation of the client-updated machine learning model may include causing the apparatus to: multiply a learning rate by an average of a plurality of client-updated machine learning models to obtain an update delta; and add the update delta to the machine learning model for an updated machine learning model. The apparatus may be caused to: provide the updated machine learning model to the client to facilitate reliance upon the updated machine learning model instead of the machine learning model.

Embodiments provided herein may include a computer program product having at least one non-transitory computer-readable storage medium having computer-executable program code instructions stored therein. The computer-executable program code instructions include program code instructions to: provide a machine learning model to a client; receive a state vector from the client; determine, based on using the state vector as input to the machine learning model, a representative location of the client; and provide, to the client, location-related services or information based on the representative location of the client. The representative location of the client may include a context vector. The context vector may include an indication of a count of points-of-interest for a respective category of a plurality of categories of points-of-interest.

The computer program product of some embodiments may include program code instructions to: update a machine learning model based at least in part on the representation of the client-updated machine learning model. The program code instructions to update a machine learning model based at least in part on the representation of the client-updated machine learning model may include program code instructions to: multiply a learning rate by an average of a plurality of client-updated machine learning models to obtain an update delta; and add the update delta to the machine learning model for an updated machine learning model. Embodiments may include program code instructions to provide the updated machine learning model to the client to facilitate reliance upon the updated machine learning model instead of the machine learning model.

Embodiments provided herein may include a method that includes: providing a machine learning model to a client; receiving a state vector from the client; determining, based on using the state vector as input to the machine learning model, a representative location of the client; and providing, to the client, location-related services or information based on the representative location of the client. The representative location of the client may include a context vector. The context vector may include an indication of a count of points-of-interest for a respective category of a plurality of categories of points-of-interest.

Methods may include: providing a request to the client for a client-updated machine learning model; and receiving a representation of a client-updated machine learning model. Methods may include updating a machine learning model based at least in part on the representation of the client-updated machine learning model. Updating a machine learning model based at least in part on the representation of the client-updated machine learning model may include: multiplying a learning rate by an average of a plurality of client-updated machine learning models to obtain an update delta; and adding the update delta to the machine learning model for an updated machine learning model.

Embodiments provided herein may provide an apparatus that includes: means for providing a machine learning model to a client; means for receiving a state vector from the client; means for determining, based on using the state vector as input to the machine learning model, a representative location of the client; and means for providing, to the client, location-related services or information based on the representative location of the client. The representative location of the client may include a context vector. The context vector may include an indication of a count of points-of-interest for a respective category of a plurality of categories of points-of-interest.

An example apparatus may include: means for providing a request to the client for a client-updated machine learning model; and means for receiving a representation of a client-updated machine learning model. An example apparatus may include means for updating a machine learning model based at least in part on the representation of the client-updated machine learning model. The means for updating a machine learning model based at least in part on the representation of the client-updated machine learning model may include: means for multiplying a learning rate by an average of a plurality of client-updated machine learning models to obtain an update delta; and means for adding the update delta to the machine learning model for an updated machine learning model.

The above summary is provided merely for purposes of summarizing some example embodiments to provide a basic understanding of some aspects of the invention. Accordingly, it will be appreciated that the above-described embodiments are merely examples and should not be construed to narrow the scope or spirit of the invention in any way. It will be appreciated that the scope of the invention encompasses many potential embodiments in addition to those here summarized, some of which will be further described below.

BRIEF DESCRIPTION OF THE DRAWINGS

Figure 1:
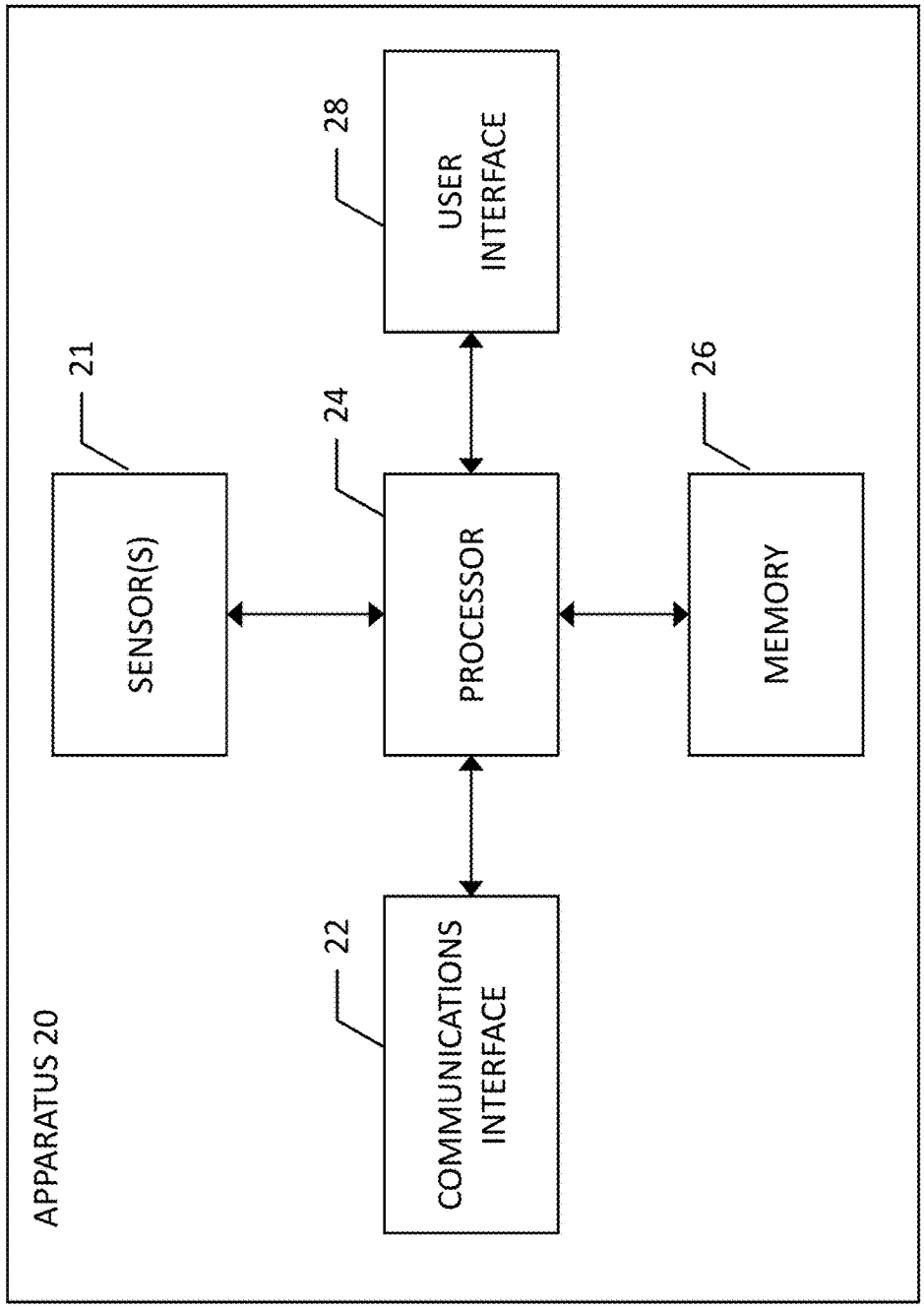
Figure 2:
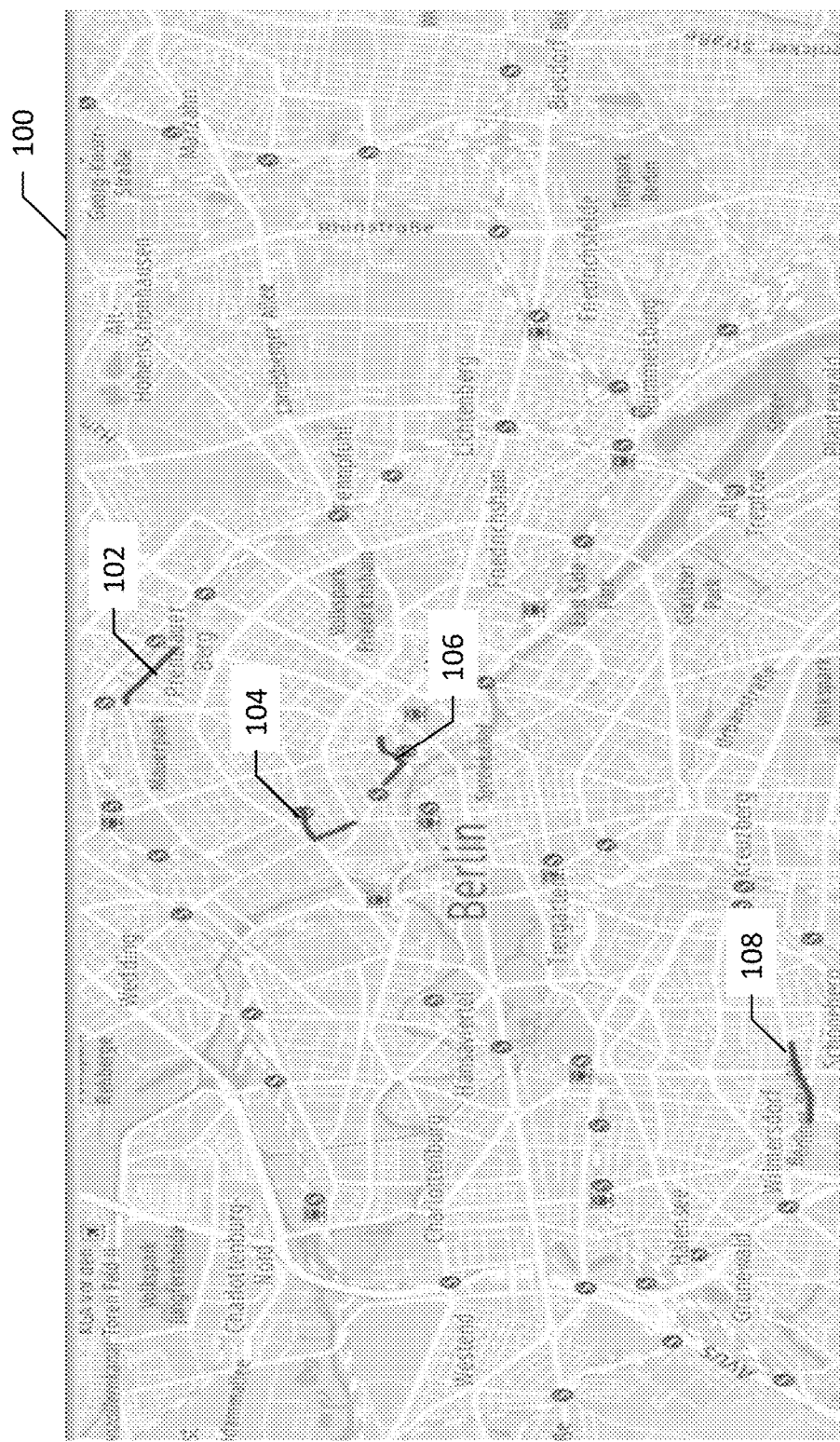
Figure 3:
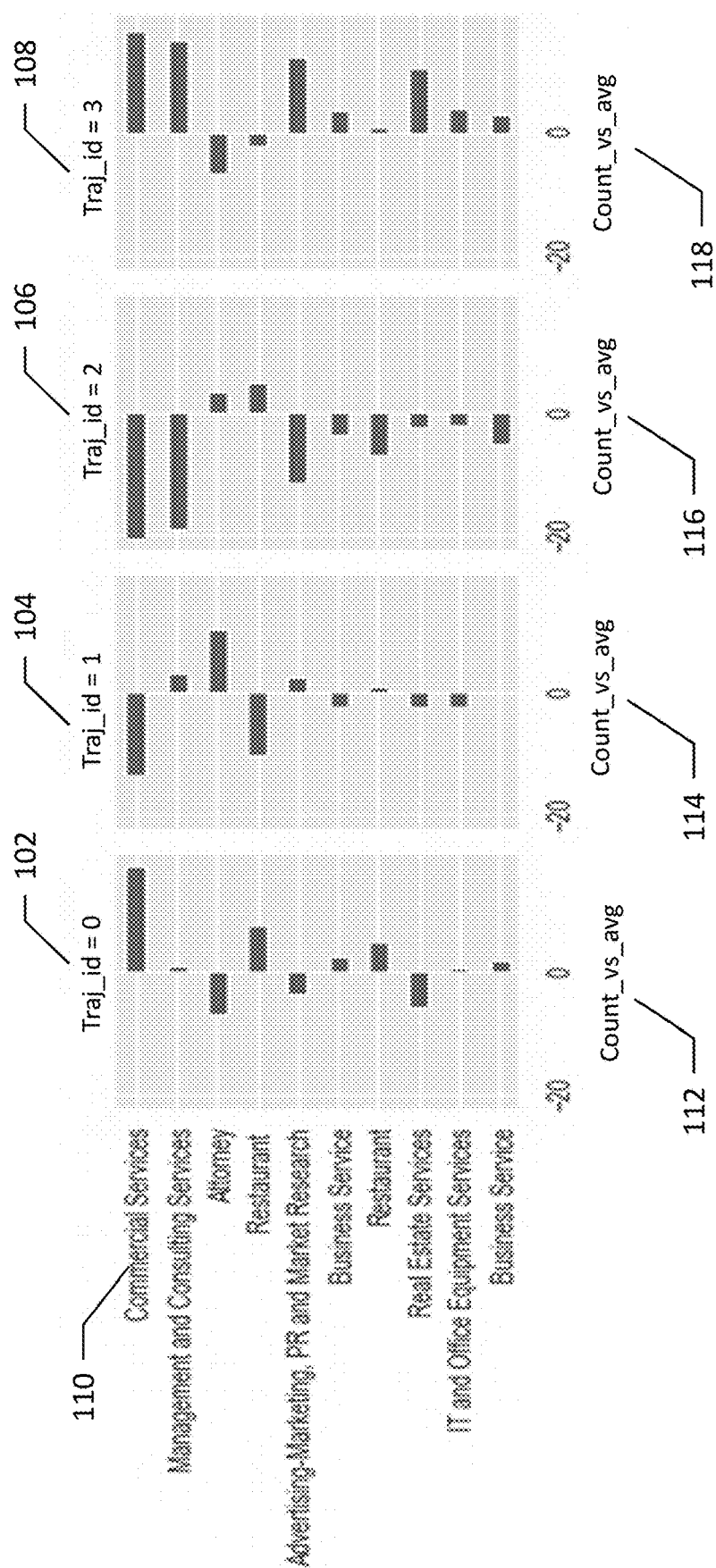
Figure 4:
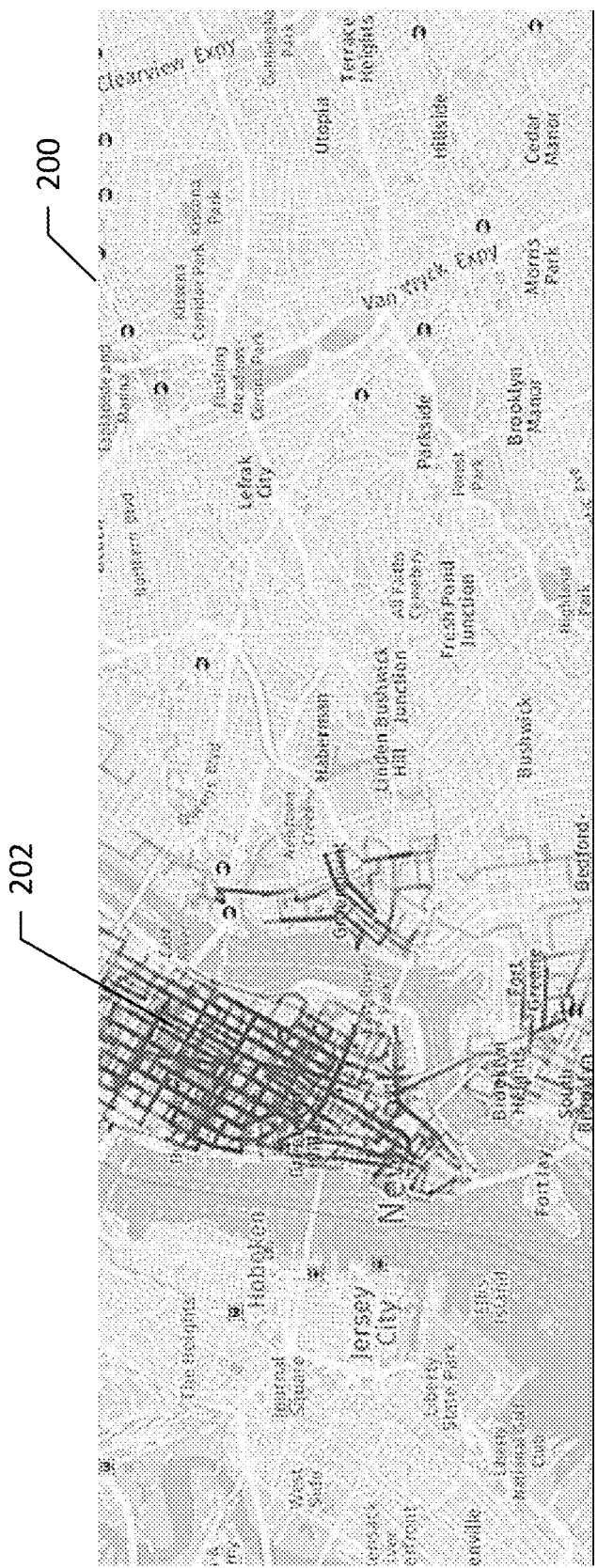
Figure 5:
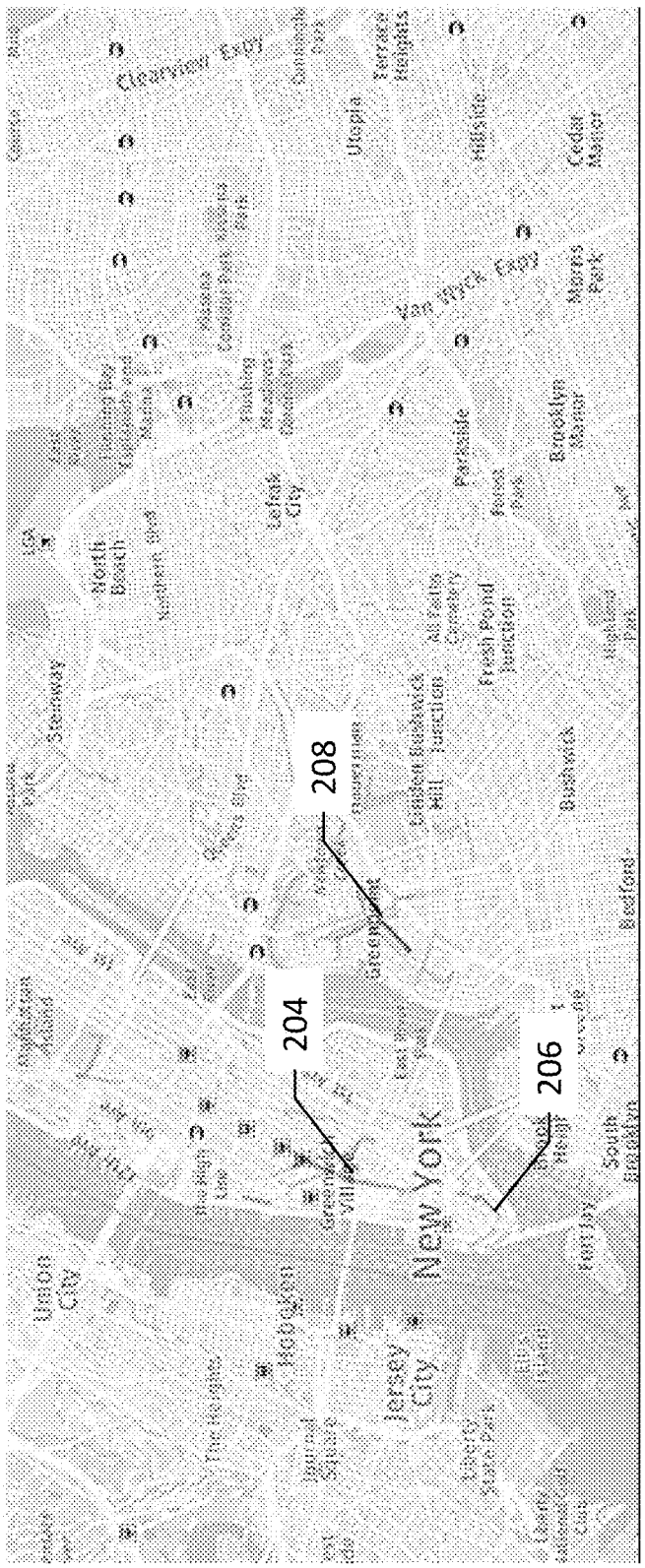
Figure 6:
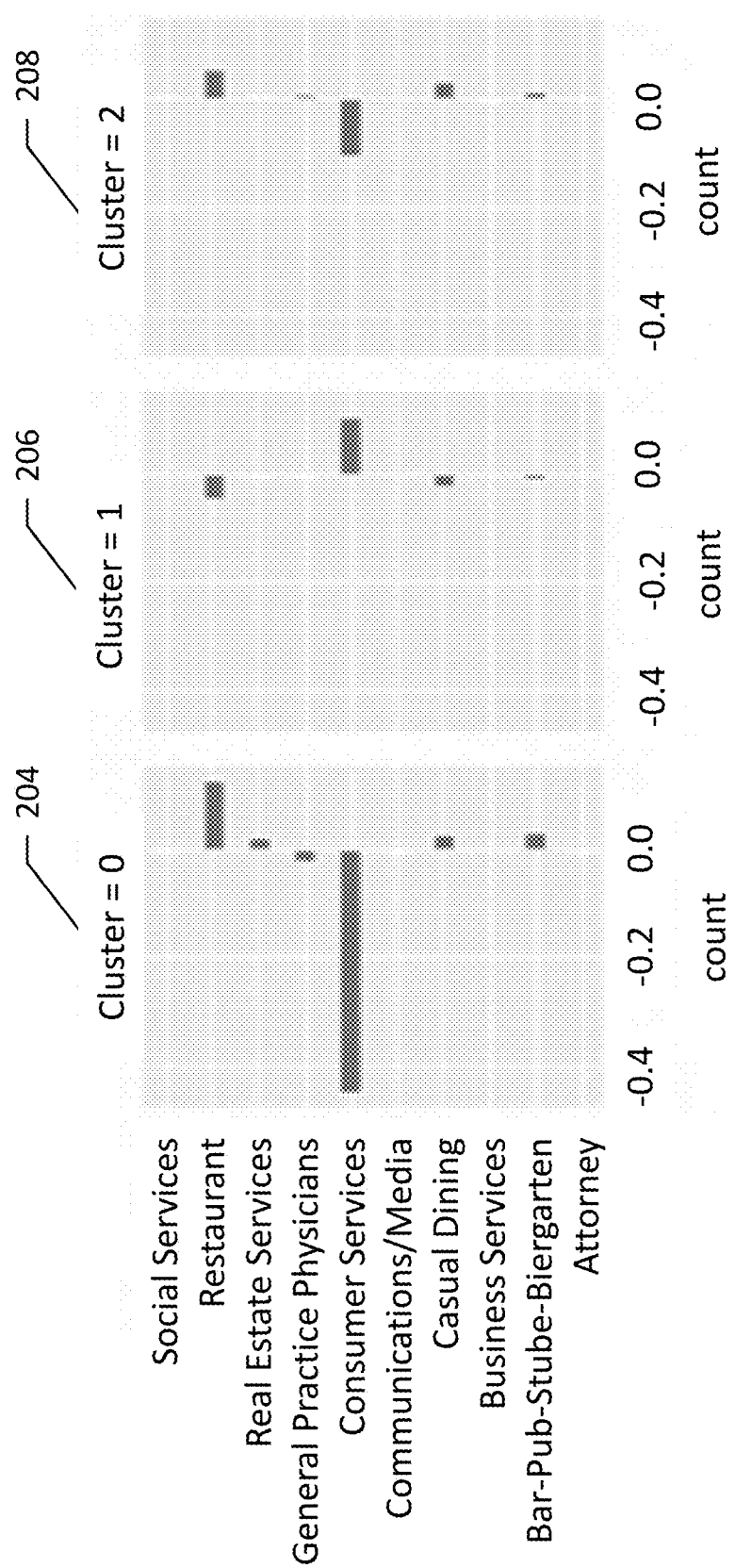
Figure 7:
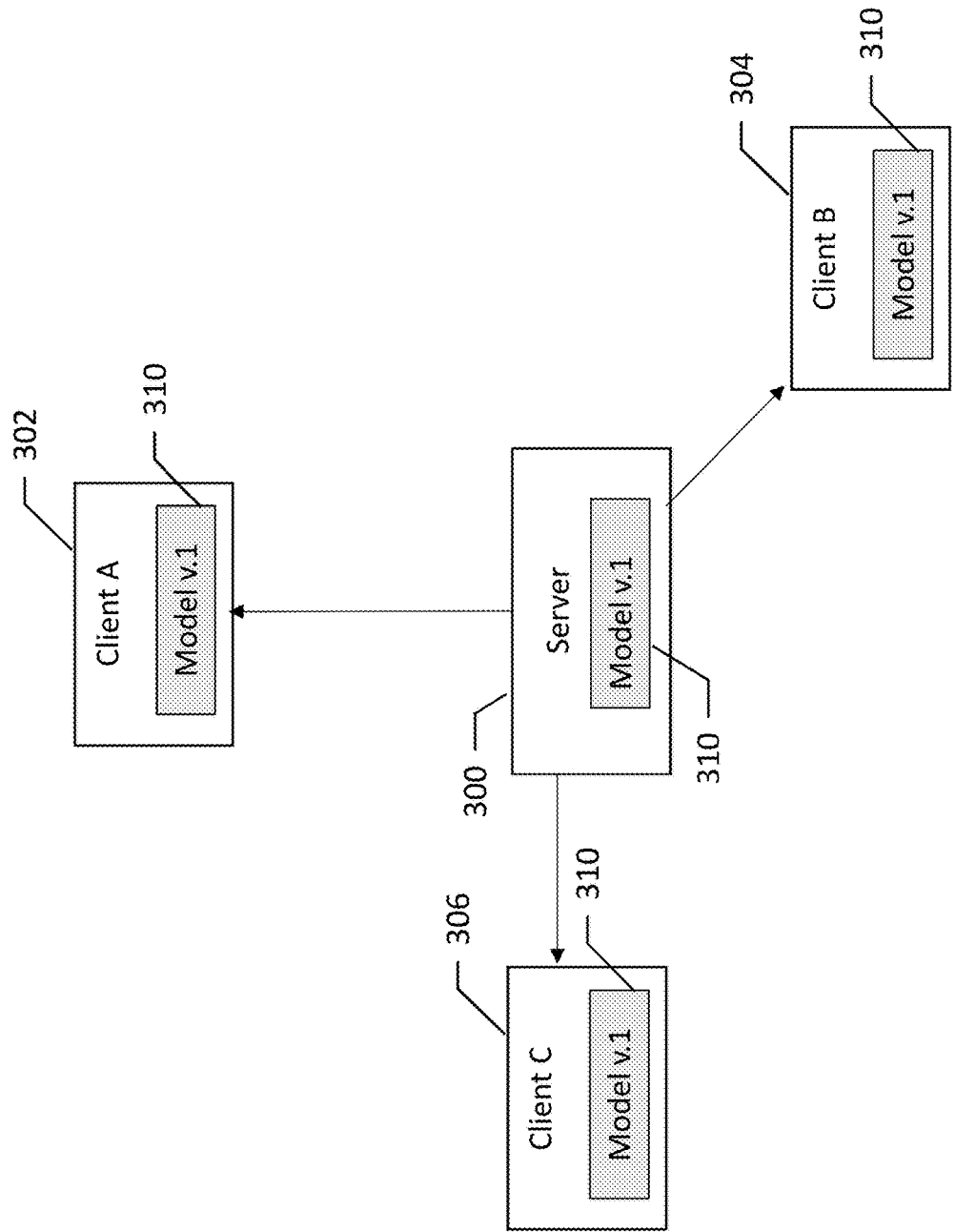
Figure 8:
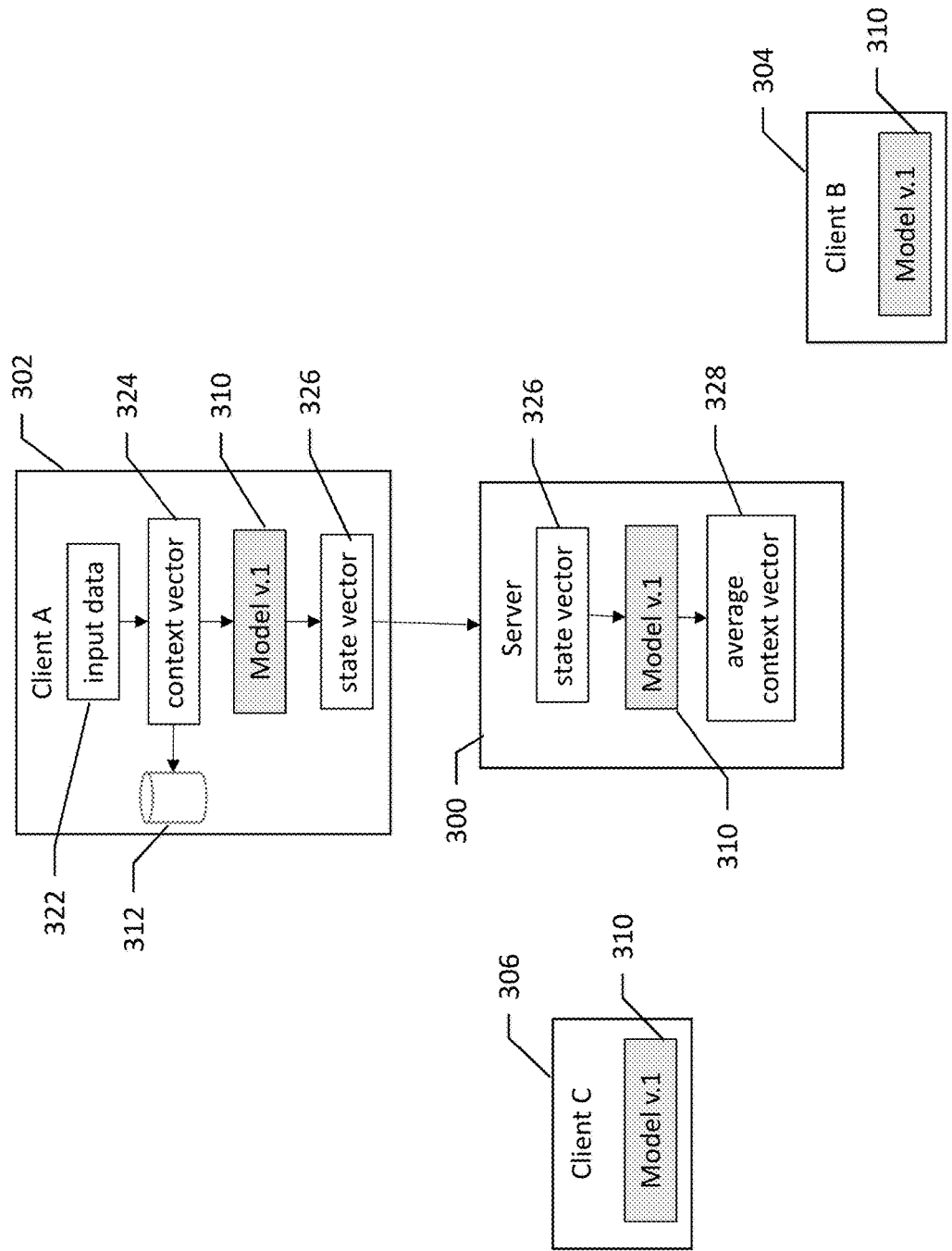
Figure 9:
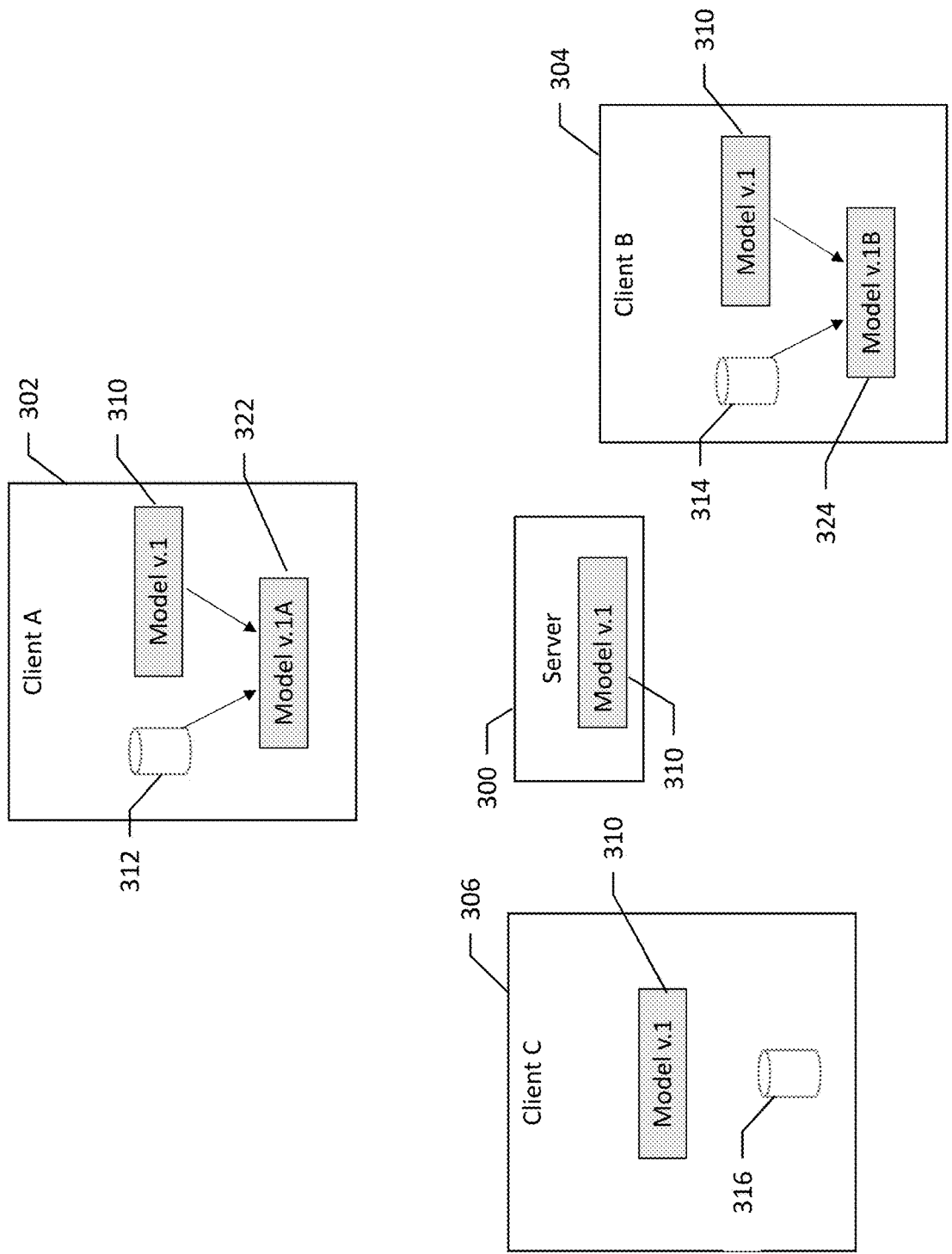
Figure 10:
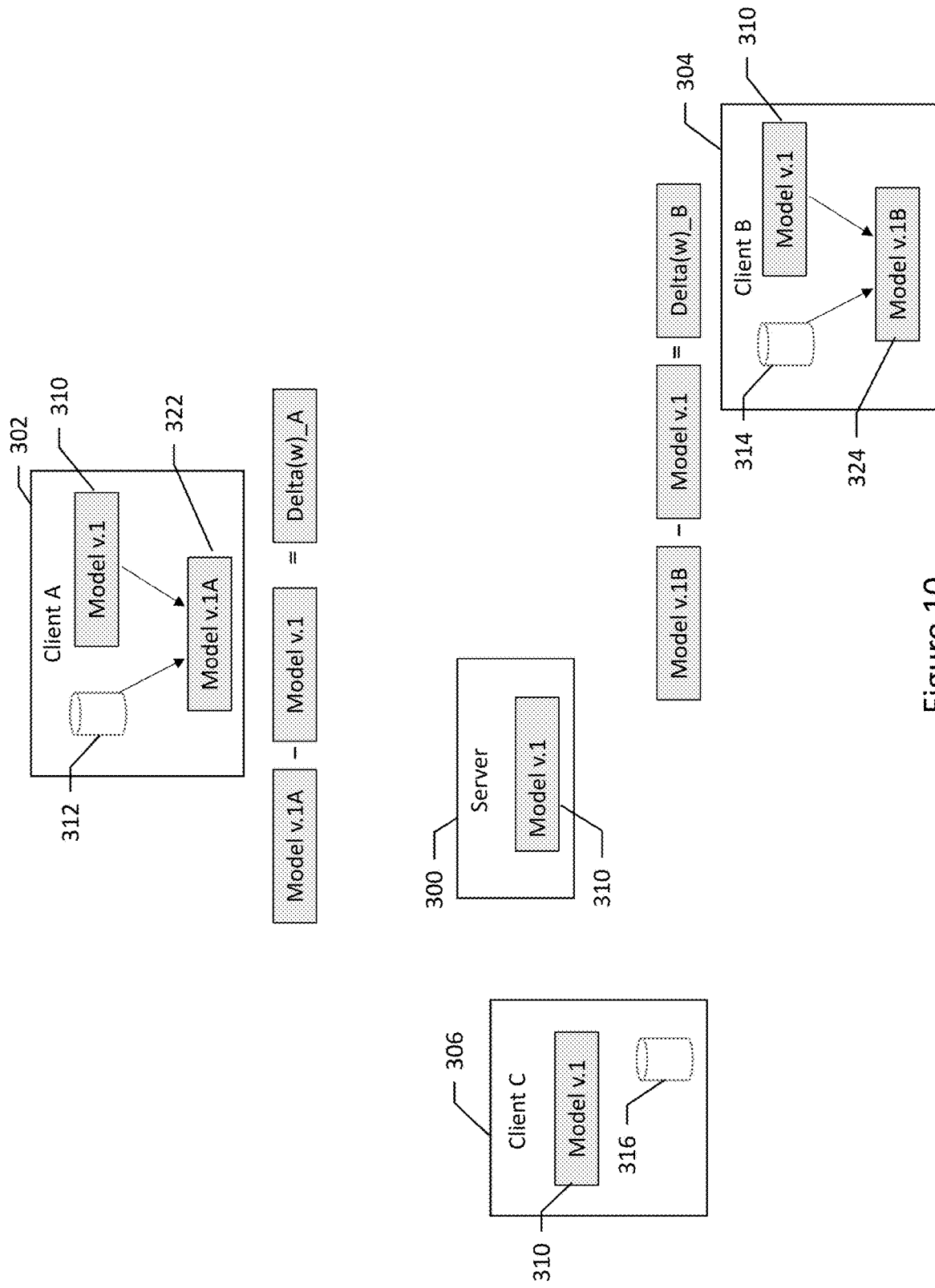
Figure 11:
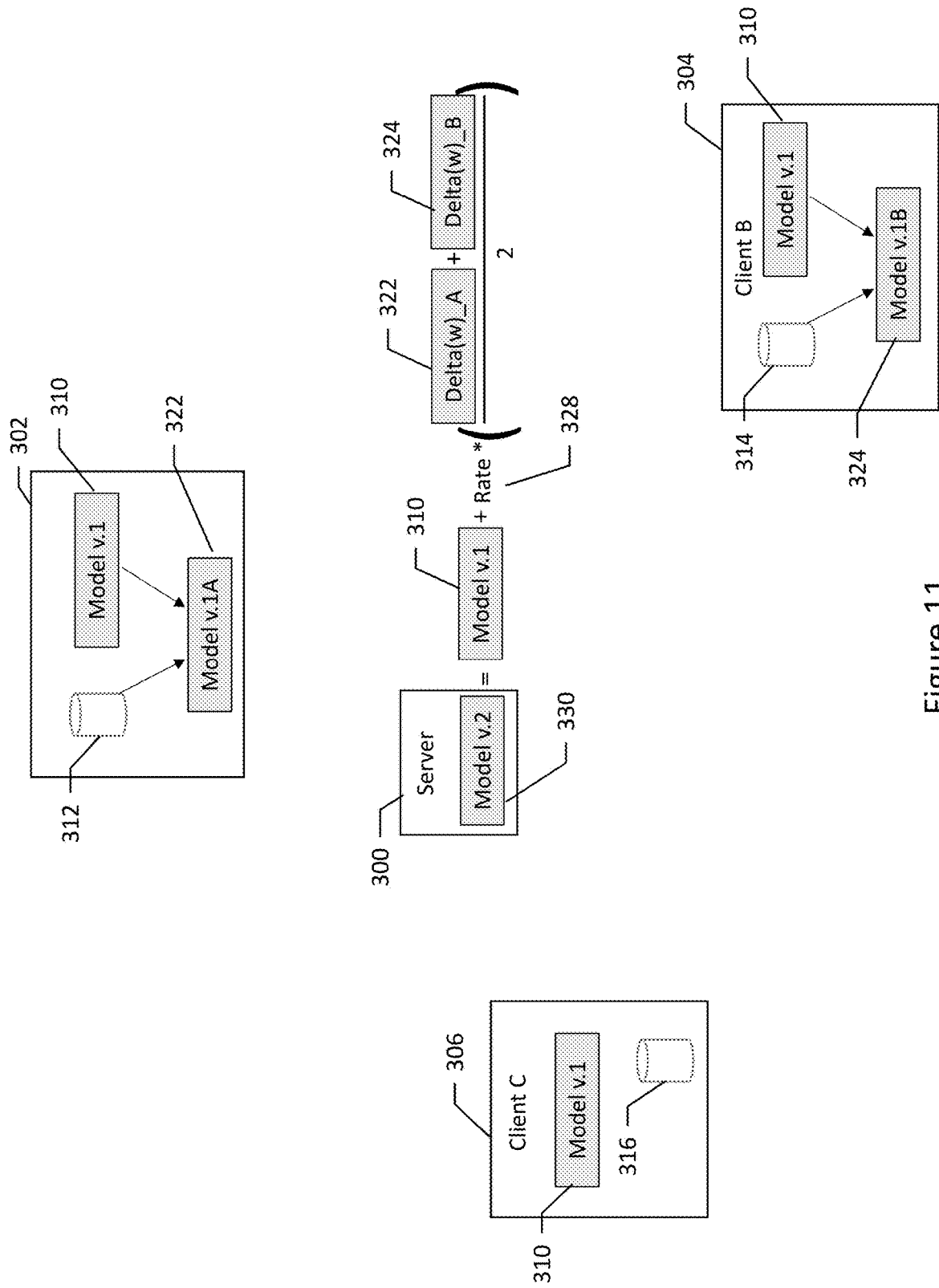
Figure 12:
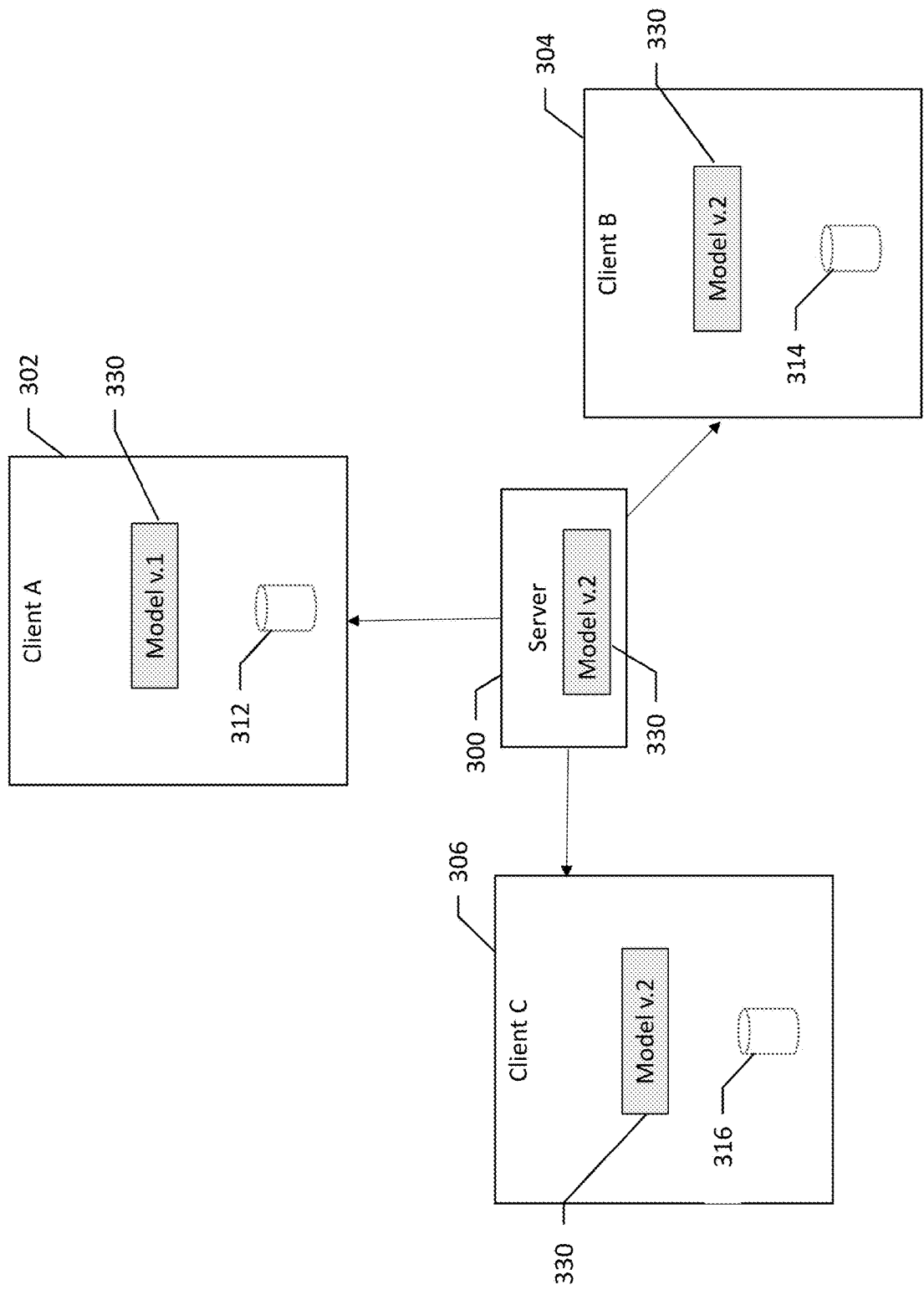
Figure 13:
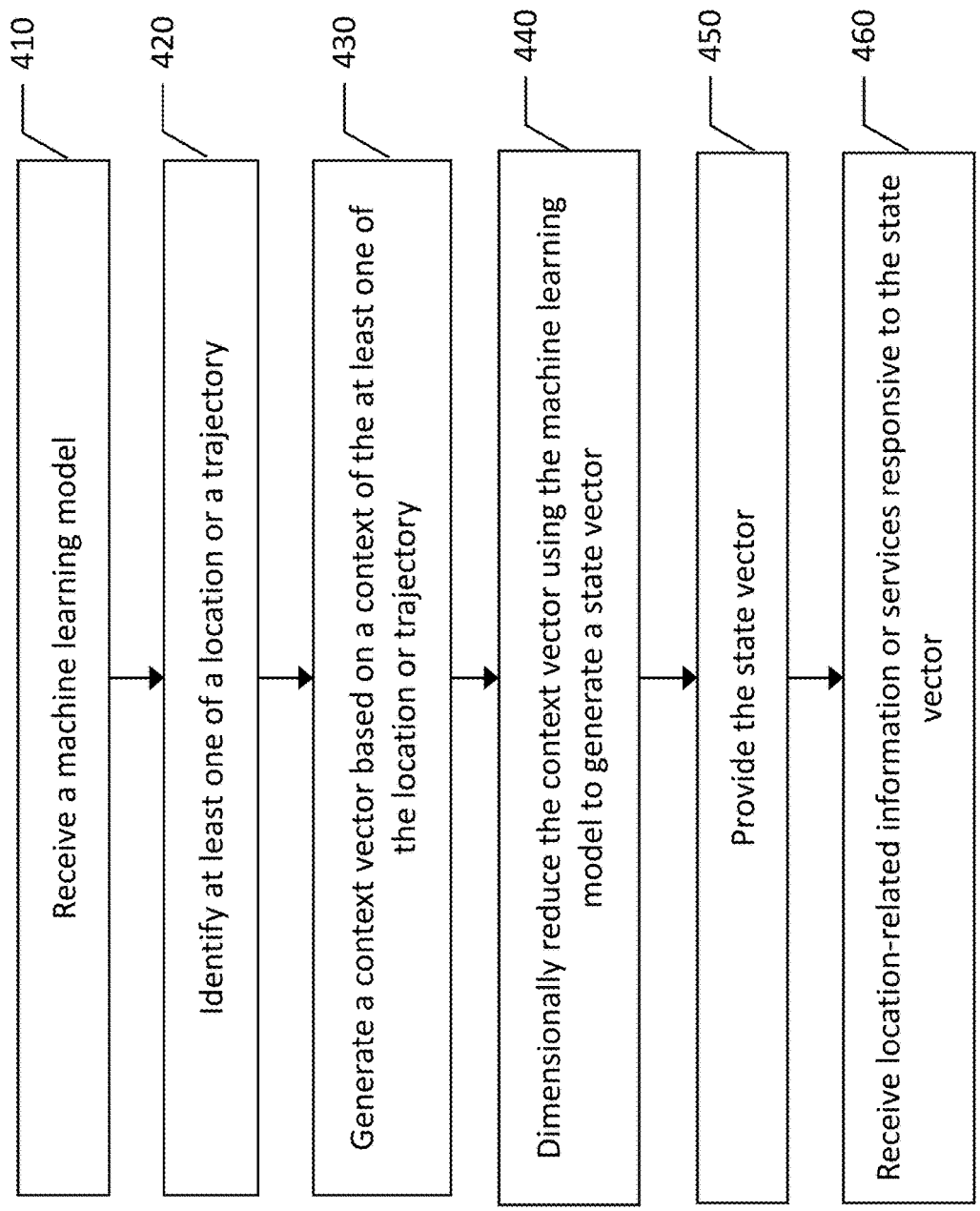
Figure 14:
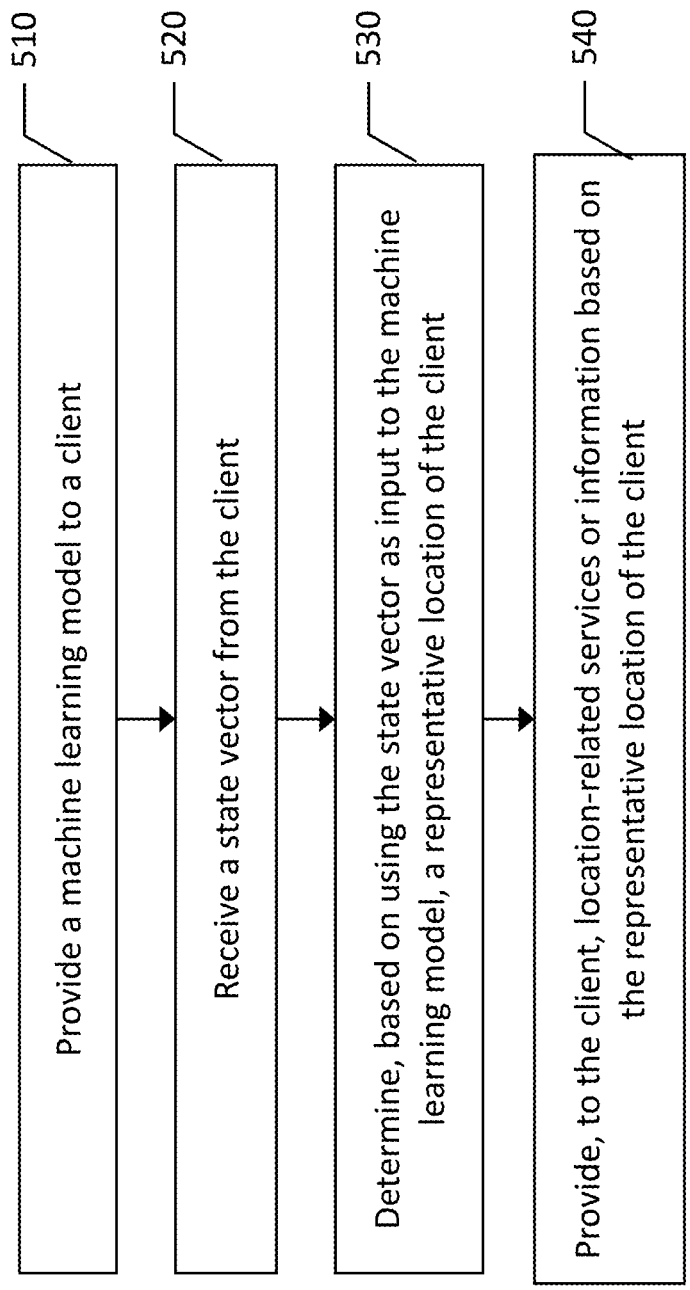

Having thus described certain example embodiments of the present disclosure in general terms, reference will hereinafter be made to the accompanying drawings which are not necessarily drawn to scale, and wherein:

FIG. 1 is a schematic diagram of an example apparatus configured for performing some of the operations described herein according to an example embodiment of the present disclosure;

FIG. 2 illustrates a map including a plurality of trajectories according to an example embodiment of the present disclosure, where the text of the map beyond the numerical element identifiers is immaterial;

FIG. 3 illustrates an indication of the number of points-of-interest for a variety of categories proximate the trajectories of FIG. 2 according to an example embodiment of the present disclosure;

FIG. 4 illustrates a map including a large number of trajectories according to an example embodiment of the present disclosure, where the text of the map beyond the numerical element identifiers is immaterial;

FIG. 5 illustrates the map of FIG. 4 with clustering applied to the trajectories to identify three clusters of trajectories according to an example embodiment of the present disclosure, where the text of the map beyond the numerical element identifiers is immaterial;

FIG. 6 illustrates an indication of the number of points-of-interest for a variety of categories proximate the clusters of FIG. 6 according to an example embodiment of the present disclosure;

FIG. 7 illustrates a system including a server and multiple clients according to an example embodiment of the present disclosure;

FIG. 8 illustrates the system of FIG. 7 where a client is providing a state vector to the server according to an example embodiment of the present disclosure;

FIG. 9 illustrates the system of FIG. 7 where clients are selected for updating the machine learning model of the server according to an example embodiment of the present disclosure;

FIG. 10 illustrates the system of FIG. 7 with the clients establishing updates to the machine learning model according to an example embodiment of the present disclosure;

FIG. 11 illustrates the system of FIG. 7 with the server updating the machine learning model based on updates from the clients according to an example embodiment of the present disclosure;

FIG. 12 illustrates the system of FIG. 7 with the server distributing the updated machine learning model to the clients according to an example embodiment of the present disclosure;

FIG. 13 is a flowchart of a method of identifying a context of a client while maintaining data privacy and anonymity according to an example embodiment of the present disclosure; and FIG. 14 is another flowchart of a method of identifying a context of a client while maintaining data privacy and anonymity according to an example embodiment of the present disclosure.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

A method, apparatus and computer program product are provided in accordance with an example embodiment of the present disclosure for identifying a context of a client while maintaining data privacy and anonymity. Users of mobile devices or clients want information provided to them that is relevant and useful; however, users often want to share as little personal data and information as possible. These desires are in conflict as the best way to provide useful information to a user is to know as much about that user as possible.

Profiling users of advertisement-supported and location-based services can provide useful information to a user while connecting those users to merchants that can provide products and services to the user. Understanding users' context is an important aspect of advertisement technology, such that relevant information can be shown to users. Bombarding a user with irrelevant advertising desensitizes a user to advertising and renders the user advertisement-weary, thereby reducing the efficacy of the advertisements. Advertisers want to target potential customers for whom their products and services are relevant to maximize their advertising spend. Advertisers buy ad impressions for user segments such as "coffee shop customer" or "frequent traveler". For mobile applications, location can help with such segmentation; however, this may compromise privacy. Embodiments described herein provide privacy-preserving machine learning to resolve the tension between the usefulness of a machine learning approach and the privacy cost for its users. Embodiments enable the identification of the context of a user with a high degree of accuracy while maintaining the privacy of the user.

Product and service providers who provide an online service may want to improve user segmentation by taking into account user locations. The straight-forward approach is that the users simply send their location to the service provider and the service identifies additional information about that location (e.g., the types of points-of-interest or POIs around that location) to make further inferences. However, this comes at the high cost of revealing the users' exact location at a high frequency. This approach comes under ever increasing scrutiny with users becoming more aware of the volume of data about them that may be shared such that mobile operating systems are now actively counteracting such approaches and alerting users to when their location is being tracked by different mobile device applications.

Embodiments provided herein perform user segmentation not based on users' actual location, but to have their client devices compute their state in a highly dimension-reduced, abstract state space. The model for transforming the location and its context into the abstract state space is computed and updated in a distributed, "federated" manner such that the observed locations and location contexts can be used to train the model without disclosing their exact contexts. The users of the received information, such as the advertisers or service providers, can revert the dimension-reduced location back into prototypical feature vectors from the original space and thus can get an idea of the average context of a user sending a particular state.

FIG. 1 is a schematic diagram of an example apparatus configured for performing some of the operations described herein, particularly the operations of identifying a context, generating feature vectors based on the context, and establishing a state of the client device. The example apparatus may optionally be configured for receiving a state of a client device, and based on a machine learning model of state vectors, identify feature vectors and estimate a context of the client device. Apparatus 20 is an example embodiment that may be embodied by or associated with any of a variety of computing devices that include or are otherwise associated with a device configured for providing advanced driver assistance features. For example, the computing device may embodied or partially embodied as a mobile terminal, such as a personal digital assistant (PDA), mobile telephone, smart phone, personal navigation device, tablet computer, camera or any combination of the aforementioned systems. The computing device of some embodiments may be a navigation system of a vehicle or an advanced driver assistance system (ADAS). Optionally, the computing device may be a fixed computing device, such as a desktop computer, server, or the like.

Optionally, the apparatus may be embodied by or associated with a plurality of computing devices that are in communication with or otherwise networked with one another such that the various functions performed by the apparatus may be divided between the plurality of computing devices that operate in collaboration with one another.

The apparatus 20 may be equipped with any number of sensors 21, such as a global positioning system (GPS), accelerometer, image sensor, and/or gyroscope. Any of the sensors may be used to sense information regarding the location, movement, positioning, or orientation of the device for use in identifying a location of the device, as described herein according to example embodiments. In some example embodiments, such sensors may be implemented in a vehicle or other remote apparatus such as a mobile device, and the information detected may be transmitted to the apparatus 20, such as by near field communication (NFC) including, but not limited to, Bluetooth™ communication, Wi-Fi communication, or the like.

The apparatus 20 may include, be associated with, or may otherwise be in communication with a communication interface 22, processor 24, a memory device 26 and a user interface 28. In some embodiments, the processor (and/or co-processors or any other processing circuitry assisting or otherwise associated with the processor) may be in communication with the memory device via a bus for passing information among components of the apparatus. The memory device may be non-transitory and may include, for example, one or more volatile and/or non-volatile memories. In other words, for example, the memory device may be an electronic storage device (for example, a computer readable storage medium) comprising gates configured to store data (for example, bits) that may be retrievable by a machine (for example, a computing device like the processor). The memory device may be configured to store information, data, content, applications, instructions, or the like for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

The processor 24 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 24 may be configured to execute instructions stored in the memory device 26 or otherwise accessible to the processor. Alternatively or additionally, the processor may be configured to execute hard coded functionality. As such, whether configured by hardware or software methods, or by a combination thereof, the processor may represent an entity (for example, physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (for example, the computing device) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

The apparatus 20 of an example embodiment may also include or otherwise be in communication with a user interface 28. The user interface may include a touch screen display, a speaker, physical buttons, and/or other input/output mechanisms. In an example embodiment, the processor 24 may comprise user interface circuitry configured to control at least some functions of one or more input/output mechanisms. The processor and/or user interface circuitry comprising the processor may be configured to control one or more functions of one or more input/output mechanisms through computer program instructions (for example, software and/or firmware) stored on a memory accessible to the processor (for example, memory device 24, and/or the like).

The apparatus 20 of an example embodiment may also optionally include a communication interface 22 that may be any means such as a device or circuitry embodied in either hardware or a combination of hardware and software that is configured to receive and/or transmit data from/to other electronic devices in communication with the apparatus, such as by NFC, described above. Additionally or alternatively, the communication interface 22 may be configured to communicate over Global System for Mobile Communications (GSM), such as but not limited to Long Term Evolution (LTE). In this regard, the communication interface 22 may include, for example, an antenna (or multiple antennas) and supporting hardware and/or software for enabling communications with a wireless communication network. Additionally or alternatively, the communication interface 22 may include the circuitry for interacting with the antenna(s) to cause transmission of signals via the antenna(s) or to handle receipt of signals received via the antenna(s). In some environments, the communication interface 22 may optionally support wired communication and/or may alternatively support vehicle to vehicle or vehicle to infrastructure wireless links. Additionally, signals received via the communications interface 22 may be processed for use in identifying a location of the device.

Embodiments described herein identify the context of a client while maintaining data privacy and anonymity. According to an example embodiment, location fingerprinting may be used to identify a context of a client device. FIG. 2 illustrates a map 100 of a region. Identified within the map 100 are four trajectories, 102, 104, 106, and 108. The trajectories represent paths taken by users, or more specifically, mobile devices of respective users. While trajectories are identified, embodiments apply similarly to single locations rather than paths.

For each of the four trajectories 102, 104, 106, and 108, the points-of-interest proximate each point or trajectory are analyzed and the number of points-of-interest per category are counted. Points-of-interest may include any of a wide variety of places, such as restaurants, businesses, monuments, museums, kiosks, etc. Essentially, a point-of-interest is any business, service, location, or the like that may be sought by a user. FIG. 3 illustrates the four trajectories 102, 104, 106, and 108 represented by a trajectory identifier (traj_id) with an indication of the number of points-of-interest for a variety of categories 110 around each trajectory. As shown, the categories 110 are identified as commercial services, management and consulting services, attorneys, restaurants, etc.

The term "proximate" references a distance or a distance and direction (e.g., distance and heading) around a point-of-interest or a trajectory. The distance or distance and direction may be a tunable parameter in that an operator or service provider can tune embodiments based on the accuracy with which locations are established through the context vectors and state vectors. The proximity within which points-of-interest may be considered can be a distance parameter (e.g., a radius), a line-of-sight or field-of-view parameter, or the like. Further, the proximity within which points-of-interest may be considered may be, in part, established based on a density of points-of-interest. For example, if "proximate" is established as within a predefined radius, the radius may be relatively smaller in an environment with a high density of points-of-interest, such as in a city or urban environment. The radius may be relatively larger in an environment with a low density of points-of-interest, such as in a rural or even suburban environment.

While a location point is established as a single location at a single point in time, a trajectory includes two or more locations over a period of time. Trajectories may be considered for federated learning in establishing location where the trajectories are established based on location points over a predetermined time frame (e.g., thirty second intervals), a trailing time period (e.g., the last two minutes of location information), a path within a geofence of fixed dimensions, segments of a total path of a device, etc. Thus, trajectories can be portions of a traveled path or potentially the entirety of a traveled path. Embodiments described herein may use trajectories to identify location information for a sequence of locations within the trajectory, providing contextually aware information to a device for the sequence of locations rather than for a single location point.

For each trajectory, an indication of the number of points-of-interest for each category is displayed in the chart, where the number is indicated through a relative measure. As shown at 112, the number of points-of-interest of each category are indicated relative to the average for trajectory 102. Similarly, at 114, 116, and 118, the number of points-of-interest of each category are indicated relative to the average for trajectories 104, 106, and 108. For example, trajectory 102 includes a much higher than average number of commercial services in the vicinity of trajectory 102, while trajectory 104 has substantially fewer commercial services than the average. Trajectory 108 is proximate many more real estate services than any of the other trajectories. The category counts of FIG. 3 illustrate a relative count rather than an absolute count of points-of-interest to illustrate more pronounced patterns and to offset the visual effect of some categories having higher counts in general.

The columns of 112, 114, 116, and 118 represent high-dimensional vectors for each respective trajectory. While FIG. 3 depicts ten categories, there are hundreds of point-of-interest categories available to be used by example embodiments of the present disclosure. FIG. 3 illustrates ten categories that may be selected as those most informative of distinctions between the trajectories.

The high-dimension vectors created as described above may be dimensionally reduced to create generalized location fingerprints. Embodiments may be dimensionally reduced by clustering, where locations or trajectories may be directly reduced to one of a number of classes, such as a preset number of three classes. Defining those classes may be based on machine learning and based on the input data. Expanding upon the aforementioned example, FIG. 4 illustrates a thousand trajectories 202 displayed in an area of map 200. Through the application of clustering to the point-of-interest category vectors such as those illustrated in FIG. 3, a number of classes may be obtained. Three clusters are illustrated in FIG. 5 with the POI vectors of the three clusters represented in FIG. 6.

As shown, cluster 204 of FIG. 5 includes a much higher presence of restaurants and an absence of consumer services. Cluster 206 includes a lower density of restaurants, but a higher density of consumer services, while Cluster 208 illustrates a higher density of restaurants, and a relatively low density of consumer services. These clusters provide an illustration of how users associated with a common trajectory of the cluster can be useful for segmentation without having to know their exact location. For instance, users in a trajectory of cluster 204 are proximate numerous restaurants, while generally not near any consumer services.

Embodiments described herein may optionally reduce the number of trajectories and feature vectors to a continuous, lower-dimensional state. An example embodiment may reduce them to an n-dimensional space where n is significantly lower than the original dimension. This can be achieved, for example, with a similar approach as described above with respect to clustering, but expressing for each data point a degree of belonging to each cluster instead of only the index of the closest cluster. Optionally, more purpose-built approaches may be employed, such as the "t-SNE" technique that visualizes high-dimensional data by giving each datapoint a location in a two or three-dimensional map, or the more established Self-Organizing Map (SOM) algorithms which assure specific properties of the mapping from input to output space. For example, many location or trajectory POI vectors may be mapped in a two-dimensional plane (for n=2 dimensional space) where more and less similar areas of the plot may be identified and users at those locations or trajectories may be sensibly grouped by their proximity in this space rather than their geographic vicinity.

Embodiments described herein may involve crowdsourcing dimensionality reduction of the POI vectors of locations and/or trajectories. There are three possible states of a user location/trajectory. The first is the raw location(s), where one or several longitude/latitude pairs represent a user's location at a given moment in time. The second state is a context vector of an n-dimensional vector representing the raw location by its context. As described above, n is the number of POI categories and the context is the count of POIs per category proximate a location or within a given range. This is an example of how a location or trajectory may be turned into a context vector. The third state is a "state vector" which is an m-dimensional vector with m being much less than n. The m-dimensional vector represents the low-dimensional encoding of the context vector.

Based on these three different states of a user location/trajectory, there are three different scenarios on what the client device may send to a server to communicate their context in order for the server to provide location-based services such as advertisements. Raw location is the easiest and most transparent way in which a client device may share their location with a server. However, this method is the least private and provides a user-specific location to services which may use that data however they choose, and may sell user location data compromising the privacy of the user. Context vectors may be generated by a user device or client and the context vector may be sent to a server to generally identify the location of a user. This method improves privacy somewhat as the context vector does not provide an exact location of the user. However, the context vectors may be of a high dimension as described above, and with a high dimension of context vector, the location may be identified thereby suffering from similar drawbacks as raw location. The third scenario for how the client device may send location related information to a server is with the use of state vectors. In this scenario, the client may obtain a context vector and transform that context vector into a state vector to provide to the server.

Dimensionally-reducing algorithms function using sampling of the raw data points. Here, context vectors are used as raw data points input for dimensional reduction. As embodiments intend to avoid sending context vectors to the server and instead dimensionally reduce the context vectors, the dimensional reduction needs to be carried out at the client. This functionality at the client is also used for the generation of training data that the server capitalizes on in a technique of federated learning. Embodiments described herein use federated learning to improve the dimensional reduction of context vectors and to provide improved location awareness to a server with regard to a client without sharing too much information with the server and sacrificing privacy.

In order to implement federated learning as described herein, a central model for dimensional reduction is provided by the server to the clients for dimensional reduction of context vectors. When the client requests location based information from the server for a particular latitude and longitude (lat, lon), the process at the client may first transform the location (lat, long) into a context vector $c1, \ldots, cn$). Then using the model at the client received from the server, the context vector ($c1, \ldots, cn$) is transformed into a state vector (x, y, . . . ). The state vector may then be provided to the server in the request for location-based information to provide a location of the client.

The server, employing the same model as deployed on the client, can use the obtained state vector to reconstruct an average context vector associated with the state vector, and use that average context vector to provide the location-based service from the server. In this manner, the server does not receive the exact context vector of the client, but provides a response of an average context vector for the state vector provided by the client, which serves as a representative location of the client. This provides the client with contextually relevant information or services from the server while maintaining substantial anonymity from the server as the server only has a representative location of the client in the form of an average context vector. In order to continuously improve upon the model, the context vector of the client is stored as a sample for unsupervised learning at a later stage.

At intervals configured by operators of the system, which may be based on the desired behavior of the system and the availability of client devices, for example, the server may run an epoch of updating its models. This involves selection of candidate devices to involve in that training. Candidate client devices may be devices that can be accessed without negative impact to the client device, such as a client device that is plugged into a power source, has sufficient bandwidth, has available processing capacity, and has seen a minimum number of examples of context vectors. Each candidate device may receive a request for a proposed model update within a given time window. The selected candidate clients update their models based on the previously stored context vectors locally saved. The updated models are provided to the server.

In general, machine learning models can be represented by a set of vectors w. The clients can, after training, arrive at a model w_updated, and send a proposed update to the server where the update is the delta between the updated model and the prior version of the model, represented as delta(w)=(w_updated−w_original). The delta is a difference value between the original model and the updated model. From each participating client i, the server receives proposed model updates delta(w)_i. The server may apply those changes to the model at the server where the update rule may be modeled as:

$$delta(w)_{mean} = sum(delta(w)_i \text{ for all } i)/\text{number of responding clients}$$

The central model may be updated according to the following:

$$w_{central} + \text{learning rate} * delta(w)\_mean$$

Once the new model is complete, it may be pushed to all clients as a new version of the model.

FIG. 7 illustrates an example embodiment of the present disclosure in which a server 300 which may be a server providing location-related services, distributes a dimensionally-reducing model 310 (shown as model version one or "model v.1") to a plurality of clients including example client A 302, example client B 304, and example client C 306. Client A may request location-based services using example embodiments described herein as shown in FIG. 8, where input data 322 includes a location which may be in the form of a latitude and longitude. Optionally, the input data could be a trajectory in which the form may include a plurality of latitude and longitude pairs. The input data may be converted by the client 302 to a context vector as described above with respect to FIG. 3. The context vector may then be processed by the model 310 for dimensional reduction to a state vector 326. The state vector 326 may be provided to the server 300, which processes the state vector through the same model 310 to obtain the average context vector 328. This average context vector provides a degree of anonymity to the client 302, while also enabling the server 300 to provide relevant location based services and information. The context vector 326 generated at Client A 302 is also locally saved in memory 312 for subsequent unsupervised learning. This same process may occur with respect to each client including Client B 304 and Client C 306 of FIG. 8.

As described above, at configured intervals, the server 300 may run an epoch or period of updating its models by selecting candidate devices to involve in the training. According to the embodiment of FIG. 9, Client A 302 and Client B 304 are selected. The reasons for selection of Client A and Client B may be due to available power of the clients, bandwidth, processing capacity, or the like. Various metrics may be considered when selecting a client for updating of the machine learning model.

Client A 302 and Client B 304 may update their respective models based on the locally stored context vectors. As shown in FIG. 10, Model v.1 310 of Client A is updated with context vectors of memory 312 to become Model v. 1A 322. Similarly, Model v.1 300 of Client B 304 is updated with context vectors from memory 314 to become Model v.1B 324.

FIG. 11 illustrates the calculated delta between the original model v.1 310 and the revised model v.1A 322 and between the original model v.1 310 and the revised model v.1B 324 which are provided to the server 300 in response to the request from the server sending a request to Client A 302 and Client B 304 for updated models. The server updates the central model to become model v.2 330 based on the learning rate 328 multiplied by the sum of the differences between the client revised models (Model v.1A 322 and Model v.1B 324) and the original model (model v.1 310) divided by the number of clients providing models, which in this case is two.

The revised model (model v.2 330) is cascaded to the clients including Client A 302, Client B 304, and Client C 306, even though Client C was not a client selected for updating. This machine learning model is thus continually improved upon thereby refining the ability to locate a client while retaining anonymity and provide the client with context-aware location information as needed.

FIGS. 13 and 14 illustrate flowcharts depicting a method according to example embodiments of the present disclosure. It will be understood that each block of the flowcharts and combination of blocks in the flowcharts may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory device 26 of an apparatus 20 employing an embodiment of the present invention and executed by a processor 24 of the apparatus 20. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a non-transitory computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

FIG. 13 is a flowchart of a method for providing dimensionally-reduced location information to a server in order to receive location-based services or information while maintaining some degree of location privacy. At 410 a machine learning model is received, such as by a client. A location or trajectory of the client is identified at 420. A context vector is generated based on a context of the location or trajectory at 430. The context vector is dimensionally reduced at 440 to generate a state vector. The state vector is then provided, such as to a server or service provider at 450. In return, at 460, the client receives location-related information or services responsive to the state vector.

FIG. 14 is a flowchart of a method for interpreting dimensionally-reduced location information in order to provide relevant location-based information or services. As shown, at 510, a machine learning model is provided to a client. A state vector is received from the client at 520. Based on using the state vector as input to the machine learning model, a representative location of the client is determined at 530. Location-related services or information are provided to the client based on the representative location of the client at 540.

In an example embodiment, an apparatus for performing the methods of FIGS. 13 and 14 above may comprise a processor (e.g., the processor 24) configured to perform some or each of the operations (410-460 and/or 510-540) described above. The processor may, for example, be configured to perform the operations (410-460 and/or 510-540) by performing hardware implemented logical functions, executing stored instructions, or executing algorithms for performing each of the operations. Alternatively, the apparatus may comprise means for performing each of the operations described above. In this regard, according to an example embodiment, examples of means for performing operations 410-460 and/or 510-540 may comprise, for example, the processor 24, a computer program product and/or a device or circuit for executing instructions or executing an algorithm for processing information as described above.

Many modifications and other embodiments of the inventions set forth herein will come to mind to one skilled in the art to which these inventions pertain having the benefit of the trainings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. An apparatus comprising at least one processor and at least one non-transitory memory including computer program code instructions, the computer program code instructions configured to, when executed, cause the apparatus to at least:
   provide a machine learning model to a client device;
   receive a state vector from the client device, wherein the state vector comprises a dimensionally-reduced context vector generated by the machine learning model based upon a context vector, wherein the context vector comprises an indication of a count of points-of-interest proximate the client device for each of a plurality of point-of-interest categories, wherein the context vector is dimensionally-reduced through clustering by the machine learning model to produce the state vector including an indication of a count of points-of-interest for the client device for each of a plurality of point-of-interest classes, and wherein a number of point-of-interest classes is fewer than a number of point of interest categories;
   determine, based on using the state vector as input to the machine learning model at the apparatus, a reconstructed context vector of a representative location of the client device, wherein the reconstructed context vector comprises a count of points-of-interest for each of a plurality of reconstructed point-of-interest categories, wherein the number of reconstructed point-of-interest categories is greater than the number of point-of-interest classes; and
   provide, to the client device, location-related services or information based on the representative location of the client device.

2. The apparatus of claim 1, wherein the reconstructed context vector comprises an indication of a count of points-of-interest for a respective category of a plurality of categories of points-of-interest.

3. The apparatus of claim 1, wherein the apparatus is further caused to:
   provide a request to the client device for a client-updated machine learning model; and
   receive a representation of a client-updated machine learning model.

4. The apparatus of claim 3, wherein the apparatus is further caused to:
   update the machine learning model based at least in part on the representation of the client-updated machine learning model.

5. The apparatus of claim 4, wherein causing the apparatus to update the machine learning model based at least in part on the representation of the client-updated machine learning model comprises causing the apparatus to:
   multiply a learning rate by an average of a plurality of client-updated machine learning models to obtain an update delta; and
   add the update delta to the machine learning model for an updated machine learning model.

6. The apparatus of claim 5, wherein the apparatus is further caused to:
   provide the updated machine learning model to the client device to facilitate reliance upon the updated machine learning model instead of the machine learning model.

7. A computer program product comprising at least one non-transitory computer-readable storage medium having computer-executable program code instructions stored therein, the computer-executable program code instructions comprising program code instructions to:

provide a machine learning model from an apparatus to a client device;

receive a state vector from the client device, wherein the state vector comprises a dimensionally-reduced context vector generated by the machine learning model based upon a context vector, wherein the context vector comprises an indication of a count of points-of-interest proximate the client device for each of a plurality of point-of-interest categories, wherein the context vector is dimensionally-reduced through clustering by the machine learning model to produce the state vector including an indication of a count of points-of-interest for the client device for each of a plurality of point-of-interest classes, and wherein a number of point-of-interest classes is fewer than a number of point of interest categories;

determine, based on using the state vector as input to the machine learning model at the apparatus, a reconstructed context vector of a representative location of the client device, wherein the reconstructed context vector comprises a count of points-of-interest for each of a plurality of reconstructed point-of-interest categories, wherein the number of reconstructed point-of-interest categories is greater than the number of point-of-interest classes; and provide, to the client device, location-related services or information based on the representative location of the client.

8. The computer program product of claim 7, wherein the reconstructed context vector comprises an indication of a count of points-of-interest for a respective category of a plurality of categories of points-of-interest.

9. The computer program product of claim 7, further comprising program code instruction to:

provide a request to the client device for a client-updated machine learning model; and receive a representation of a client-updated machine learning model.

10. The computer program product of claim 9, further comprising program code instructions to:

update the machine learning model based at least in part on the representation of the client-updated machine learning model.

11. The computer program product of claim 10, wherein the program code instructions to update the machine learning model based at least in part on the representation of the client-updated machine learning model comprises program code instructions to:

multiply a learning rate by an average of a plurality of client-updated machine learning models to obtain an update delta; and add the update delta to the machine learning model for an updated machine learning model.

12. The computer program product of claim 11, further comprising program code instructions to:

provide the updated machine learning model to the client device to facilitate reliance upon the updated machine learning model instead of the machine learning model.

13. A method comprising:

providing a machine learning model from an apparatus to a client device;

receiving a state vector from the client device, wherein the state vector comprises a dimensionally-reduced context vector generated by the machine learning model based upon a context vector, wherein the context vector comprises an indication of a count of points-of-interest proximate the client device for each of a plurality of point-of-interest categories, wherein the context vector is dimensionally-reduced through clustering by the machine learning model to produce the state vector including an indication of a count of points-of-interest for the client device for each of a plurality of point-of-interest classes, and wherein a number of point-of-interest classes is fewer than a number of point of interest categories;

determining, based on using the state vector as input to the machine learning model at the apparatus, a reconstructed context vector of a representative location of the client device, wherein the reconstructed context vector comprises a count of points-of-interest for each of a plurality of reconstructed point-of-interest categories, wherein the number of reconstructed point-of-interest categories is greater than the number of point-of-interest classes; and providing, to the client device, location-related services or information based on the representative location of the client device.

14. The method of claim 13, wherein the reconstructed context vector comprises an indication of a count of points-of-interest for a respective category of a plurality of categories of points-of-interest.

15. The method of claim 13, further comprising:

providing a request to the client device for a client-updated machine learning model; and receiving a representation of a client-updated machine learning model.

16. The method of claim 15, further comprising:

updating the machine learning model based at least in part on the representation of the client-updated machine learning model.

17. The method of claim 16, wherein updating the machine learning model based at least in part on the representation of the client-updated machine learning model comprises:

multiplying a learning rate by an average of a plurality of client-updated machine learning models to obtain an update delta; and adding the update delta to the machine learning model for an updated machine learning model.

\* \* \* \* \*